United States Patent [19]

Viaud

[11] Patent Number: 4,914,900
[45] Date of Patent: Apr. 10, 1990

[54] BALING MACHINE FOR FORMING CYLINDRICAL BALES OF CROP

[75] Inventor: Jean Viaud, Sarreguemines, France

[73] Assignee: Deere & Company, Moline, Ill.

[21] Appl. No.: 334,615

[22] Filed: Apr. 6, 1989

[30] Foreign Application Priority Data

Apr. 11, 1988 [GB] United Kingdom ............... 8808468

[51] Int. Cl.⁴ .......................................... A01D 39/00
[52] U.S. Cl. ......................................... 56/341; 100/88
[58] Field of Search ...................... 56/341, 343, 344; 100/77, 88, 89

[56] References Cited

U.S. PATENT DOCUMENTS

| | | | |
|---|---|---|---|
| 4,296,595 | 10/1981 | Meinero | 56/341 |
| 4,499,714 | 2/1985 | Hollmann | 56/341 |
| 4,514,969 | 5/1985 | Moosbrucker et al. | 56/341 |
| 4,534,285 | 8/1985 | Underhill | 56/341 X |
| 4,542,617 | 9/1985 | Sonntag | 56/341 |
| 4,580,398 | 4/1986 | Bruer et al. | 56/341 |
| 4,625,502 | 12/1986 | Gerhardt et al. | 56/341 |
| 4,667,592 | 5/1987 | Pentith et al. | 100/88 |

FOREIGN PATENT DOCUMENTS

| | | | |
|---|---|---|---|
| 311775 | 8/1988 | European Pat. Off. | |
| 1757733 | 5/1971 | Fed. Rep. of Germany | |
| 3710550 | 6/1988 | Fed. Rep. of Germany | |
| 2169847 | 7/1986 | United Kingdom | 56/341 |
| 8402253 | 6/1984 | World Int. Prop. O. | 56/341 |

*Primary Examiner*—Hoang C. Dang

[57] ABSTRACT

A baling machine for forming larger cylindrical bales of hay has a conventional baling chamber in which the crop is rolled into a bale by oppositely moving runs of belts. The baling chamber is fed by a delivery unit on the underside of the machine.

In order to enable the machine to work without stopping during tying the discharge of the completed bale, crop being picked up during this stage is diverted onto a web of belting material which is attached at one end to a coiling shaft and, which at the other is wound around a web support or uncoiling shaft. The coiling shaft is driven to wind the web, drawing it from the uncoiling shaft, into a spiral with the crop sandwiched in the spiral. When baling in the chamber is restarted, the uncoiling shaft is driven in the opposite direction so as to unwind the spiral on the coiling shaft and the crop released thereby from the spiral is directed into the baling chamber.

8 Claims, 4 Drawing Sheets

BALING MACHINE FOR FORMING CYLINDRICAL BALES OF CROP

BACKGROUND OF THE INVENTION

This invention relates to a baling machine for forming large cylindrical bales of crop.

Machines, towed by a tractor, for forming large cylindrical bales of hay (so called "round balers") are well-known. As the machine advances, the crop is removed from a windrow by a pickup mechanism and delivered rearwardly to a baling chamber where it is rolled into a bale. In one type of machine the chamber is defined by runs of belts trained over driven rolls, while in another type fixed position rolls form the chamber.

On completion, a bale is tied with twine wrapped around it to maintain the crop within the bale, a gate formed by the rear portion of the machine is opened and the bale is discharged.

During this period the machine is stationary since crop can no longer be delivered to the baling chamber.

In order to save time, many proposals have been made to keep the machine advancing along the windrow during the tying and discharge stage. The essence of these is to provide a storage chamber, upstream of the baling chamber, into which crop can be diverted and, when baling resumes, from which crop can be fed into the baling chamber. An example of such a machine is described and claimed in U.S. Pat. No. 4,625,502, granted to Gerhardt et al on 2 Dec. 1986.

Such machines tend to be expensive even in relation to the time which is gained by nonstop operation, the storage chamber also being formed similarly to the baling chamber. Some storage chambers not designed in this way may not afford good control of the crop. The object of the present invention is to provide a mainly "non-stop" round baler which is less expensive and yet which offers good crop control.

SUMMARY OF THE INVENTION

According to the present invention, there is provided a large round baler including a baling chamber, a storage chamber, and a crop pickup for delivering crop selectively to the baling or to the storage chamber. A more specific object of the invention is to provide a round baler of the above-described type wherein the storage chamber has a web for receiving crop thereon from the pickup and a winder mechanism for coiling the web into a spiral so that the crop is sandwiched in the spiral for storage and for uncoiling the web so that the crop is released for delivery to the baling chamber.

An object of the invention is to provide a round baler of the above-described type wherein the storage chamber includes an inexpensive winder mechanism for rolling up and storing crop during the discharge of a completed bale from the baling chamber and for thereafter unrolling the crop for feeding it together with picked up crop into the baling chamber.

These and other objects, features and advantages of the present invention will become apparent to those skilled in the art from the description which follows and from the drawings.

DESCRIPTION OF THE PREFERRED EMBODIMENT

Figure 1:
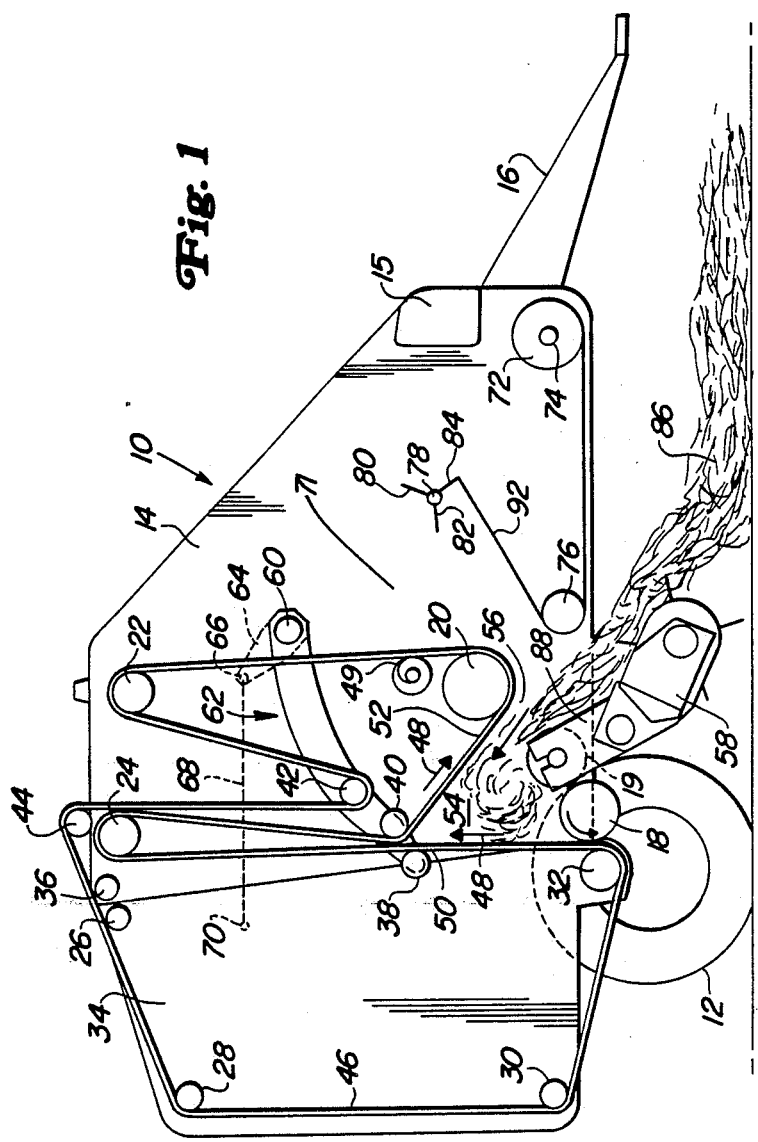
FIG. 1 is a right side elevational view (with a side removed) of a round baler of the invention at the start of the formation of a bale in the baling chamber.

In the drawings, the baler includes a main frame 10 mounted on a pair of wheels 12. The main frame includes a pair of transversely spaced upright fore-and-aft extending sidewalls 14 connected by transverse beams including a front beam 15. A draft tongue 16 is connected to a transverse beam at the front of the frame 10 and extends forwardly for attaching a baler to a tractor (not shown) which draws the machine.

A plurality of lateral rolls extends over the width of the machine. One set of rolls 18, 19, 20, 22, 24 is journalled in the sidewalls 14 while another set consisting of rolls 26, 28, 30, 32 is journalled in a gate 34 which is swingable about a pivot 36 at the top of the baler. There is also a pair of chamber restricting rolls 38, 40 and two belt take-up rolls 42, 44.

Six rubber belts 46 are trained side-by-side over the rolls, with the exception of the rolls 18, 19 which act as stripper and feed rolls respectively, to provide the configuration shown and they move in the direction indicated by arrows 48, the rolls 18, 19 being driven anticlockwise as viewed in the drawings. An auger 49 is associated with the roll 20, extending therealong and through the sidewalls 14, to carry away crop debris which tends to become trapped in this region. Upwardly extending runs 50, 52 (FIG. 1) of the belts 46 define a bale-forming chamber 54 the ends of which are provided by the sidewalls 14 and the gate 34 and which has an inlet 56 for crop received from a pickup 58 beneath it.

In order to accommodate the increasing diameter of a growing bale core in the bale-forming chamber 54, the size of the chamber must also increase and a belt take-up and tensioning mechanism is provided at either side of the machine. These mechanisms include a pair of rearwardly extending idler arms which are mounted on the main frame 10 by way of a horizontal transverse shaft 60, providing a pivot connection for the arms, and of which the right-hand arm 62 only is shown. The belt takeup roll 42 is supported at either end at an intermediate location on the arms; and the pair of chamber restricting rolls 38, 40 are supported in closely spaced relationship to each other at the free ends of the arms. The arms are biased in anticlockwise direction in the drawings. The free end of a lever portion 64 which is rigid with the pivot shaft 60 is pivotally connected at a point 66 to the cylinder of a piston and cylinder unit indicated by line 68, loading the arm 62, of which the piston is in turn pivotally connected to the gate 34 at a point 70, a similar arrangement being provided also on the right-hand side of the machine.

The walls 14 have forwardly extending portions to encompass a crop storage chamber or region 71. Between these portions is a roll of a web of conveyor belting 72 the inner end of which is attached to a transverse uncoiling or web support shaft 74 which carries the roll of belting 72 and which is disposed just behind the rear end of the tongue 16. An idler roll 76 is also mounted between the walls 14 above the pickup 58 approximately level with the shaft 74 and is disposed intermediate the shaft 74 and a coiling shaft 78 approximately level with the top of the baling chamber 54 in FIG. I, which shaft 78 again is mounted between the walls 14. The coiling shaft 78 has three plates 80, 82, 84 rigidly attached to it along its length which extend radially outwardly therefrom at 120 degree intervals around the shaft. The belting 72 is trained over the idler roll 76 and its end is attached to the radially outer lengthwise edge of the plate 84. Both the shafts 74 and 78 are drivable from the main drive of the machine via an electrical or similar clutch (not shown). Thus, the shaft 78 can be driven in an anticlockwise "coiling" direction and the shaft 74 in an anticlockwise "uncoiling" direction while the associated shaft 74, 78 respectively idles but is restrained somewhat from entirely free rotation by being braked or by being slowed frictionally thereby maintaining the belting 72 in tension. The terms "coiling" and "uncoiling" are explained below when the operation of the machine is described.

The pickup 58 works on a windrow 86 of hay and extends rearwardly and upwardly at a small angle. A feeder fork mechanism 88 is disposed at the rearward downstream end of the pickup 58, is angled more steeply upwardly and terminates at the roll 19 at the inlet 56 of the baling chamber 54. This mechanism 88 is of conventional design with a crankshaft driving a feeder fork, prongs 89 of which extend into gaps between neighboring side-by-side strippers which support the crop.

Drive to the crankshaft is transmitted through a clutch. Thus, the pickup 58 and the mechanism 88 constitute a crop delivery unit. There are potential flow paths for crop between the roll 76 and pickup 58, between the feeder fork mechanism 88 and the roll 20 (and its associated belts 46), and between the roll 20 and the roll 76.

Figure 2:
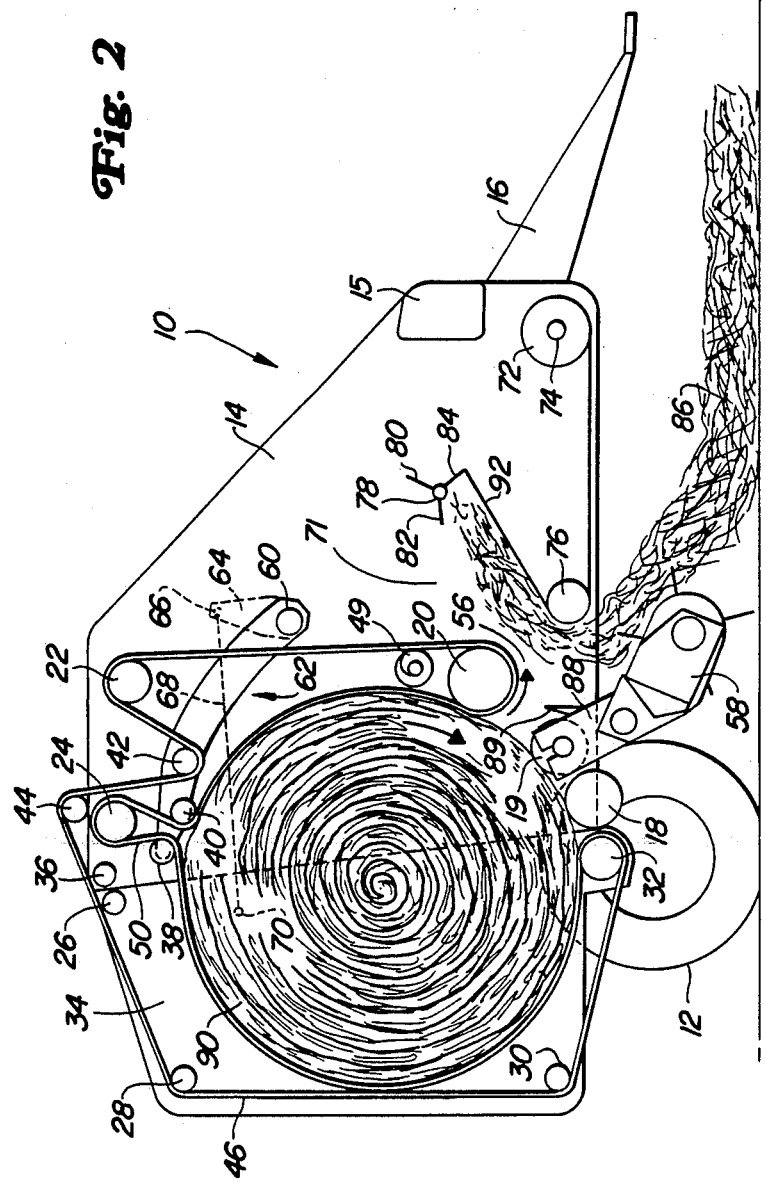
FIG. 2 is a view similar to FIG. 1 but showing the baler chamber at the completion of a bale being formed in the chamber and at the beginning of crop being fed to the winding apparatus in the storage chamber.
Figure 3:
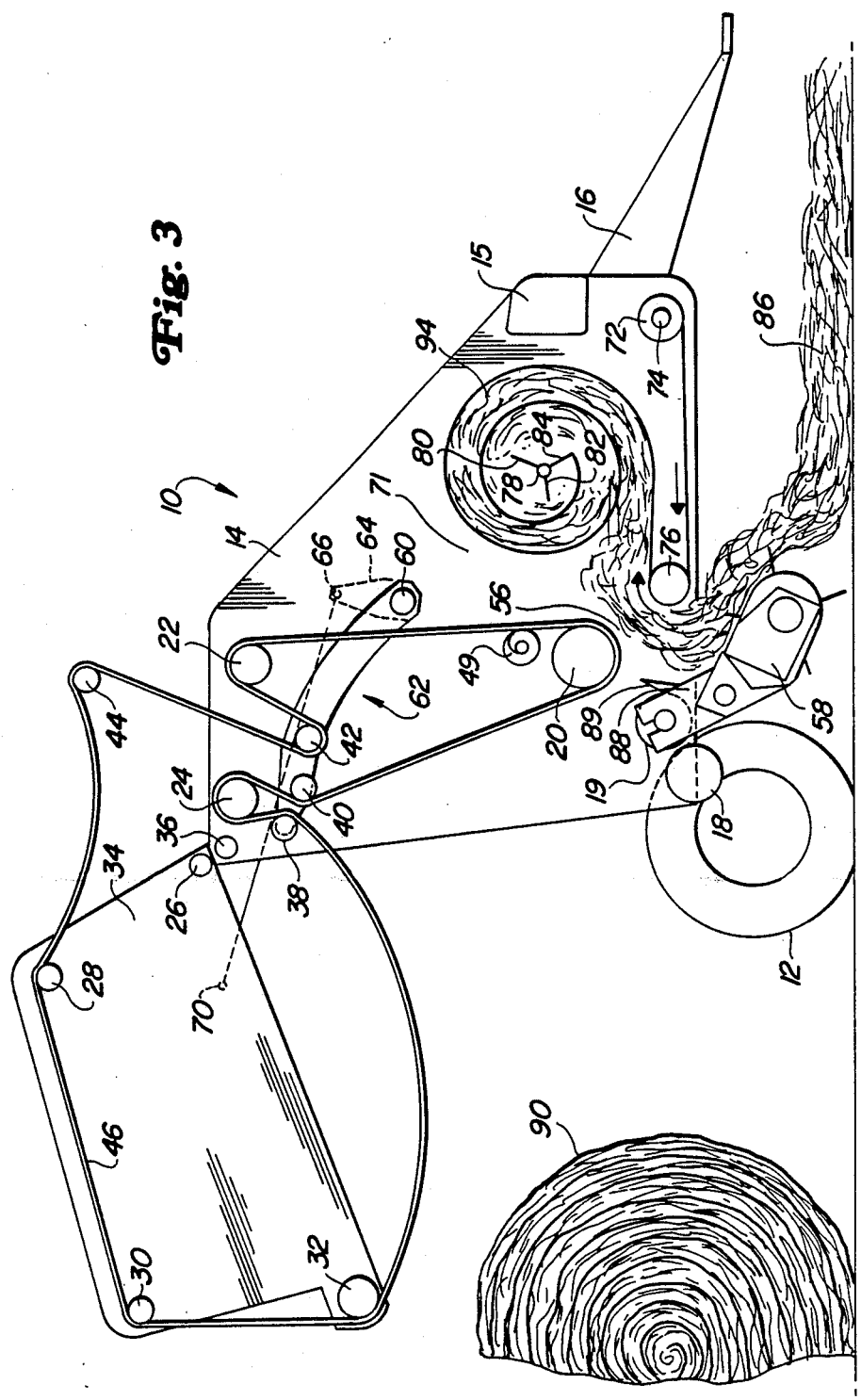
FIG. 3 is a view similar to FIG. 1 but showing the discharge of the completed bale and crop being wound up in the storage chamber by the winding apparatus.

In operation, as the round baler is drawn along the windrow 86 (as in FIG. 1), hay is lifted by the pickup 58 which transfers it to the feeder mechanism 88 which in turn raises it to the feed roll 19 at the inlet 56 of the bailing chamber 54 in which it is contacted by the oppositely moving runs 50, 52 of the belts 46 and rolled around upon itself into a bale 90. The bailing chamber 54 expands against the loaded idler arms as the bale 90 grows in size until the bale is completed (FIG. 2) whereupon crop flow to the inlet 54 by the feeder fork mechanism 88 is stopped and the bale 90 is tied with twine and is finally discharged by swinging the gate 34 upwardly, as shown in FIG. 3.

So that the baler can operate mainly nonstop during this period of tying and discharge, the feeder fork mechanism 88 is stopped by disengaging the clutch in the drive thereto and set with its fork prongs 89 at an angle (shown in FIG. 2) which is such that the crop will divert in its course to the flow path between the rolls 20 and 76, only the still functioning pickup 58 endowing the crop with its movement. The same result can be obtained, without disengaging the feeder fork, by mounting the strippers in cantilever fashion on a shaft pivoting at the downstream end of the pickup 58 enabling them to be set, when required, at an appropriate angle to divert the crop.

Thus, the crop is fed onto a run 92 of the belting 72 extending between the roll 76 and the plate 84. The coiling shaft 78 is then driven anticlockwise as in FIG. 3 causing the belting 72 to be turned in the "coiling" direction to form a spiral 94 with the crop packed between the layers of belting, the plates 80, 82, 84 serving to space the belting 72 away from the shaft 78 and initially to sweep the crop into the incipient spiral. In this way incoming crop is stored during tying and discharge of the bale 90.

Figure 4:
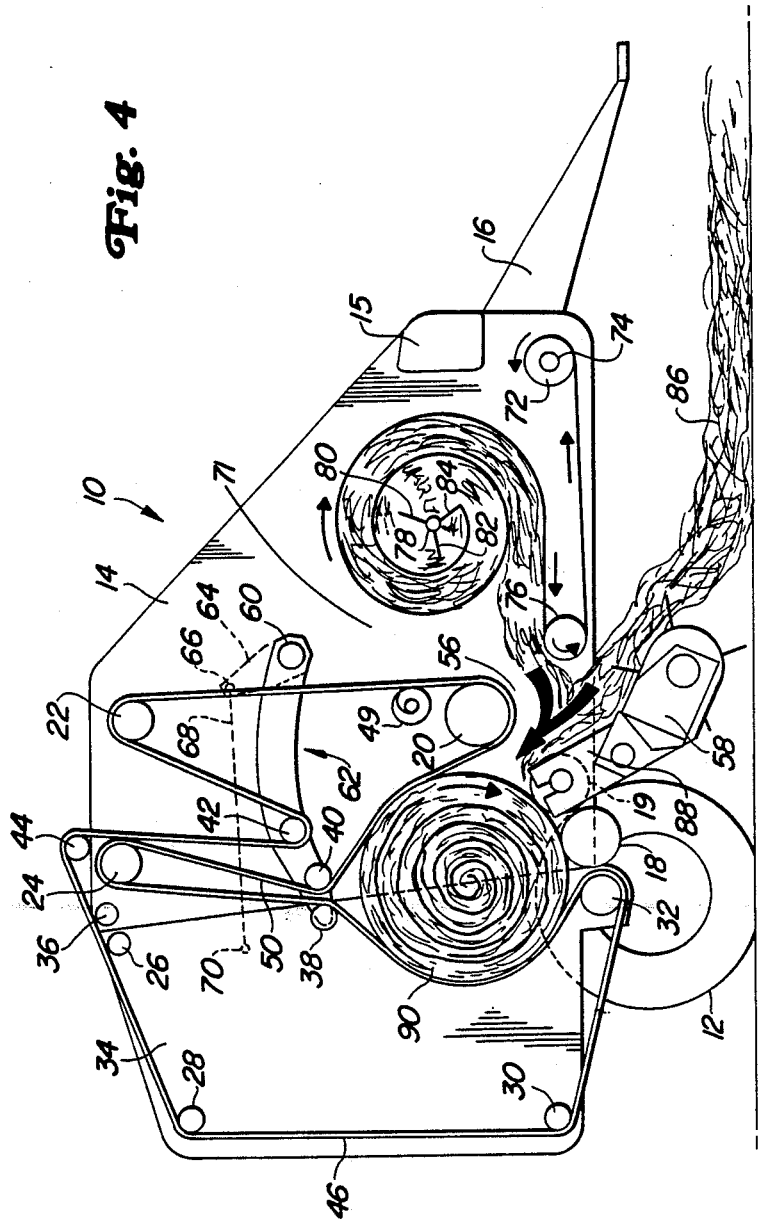
FIG. 4 is a view similar to FIG. 1 but showing the beginning of a new bale in the baling chamber while the crop wound up in the storage chamber is being unwound into the baling chamber.

Finally when the gate 34 has been closed and the feeder fork mechanism 88 restarted (or the cantilevered strippers returned from their angled position to the stripping position) baling commences again as in FIG. 4, the drive to the coiling shaft 78 is cut and then the drive to the uncoiling shaft 74 is engaged to drive it anticlockwise in the "uncoiling" direction. This results in the spiral 94 being turned clockwise to uncoil it and to advance the stored crop to the feeder fork mechanism 88 and to the inlet 56 joining the crop fed thereto from the windrow 86. Guides or a reversible feeder fork apparatus (not shown) can be positioned above the run 92 in front of the roll 20 to prevent contact during uncoiling between the crop and the belts 46.

The cycle is repeated and it is generally unnecessary to break the continuous progress of the baler along the windrow 86. A logical electronic circuit can control the cycle and the sequence can be displayed on a monitor in the cab of the tractor drawing the baler. A signal can be provided to inform the operator that the storage capacity of the belting 72 is approaching its peak. In this event the operator can reduce speed or stop until the bale 90 has been discharged and the gate 34 is again closed. The uncoiling shaft 74, the idler roll 76, and the coiling shaft 78 with its plates 80, 82, 84 constitute a "winder mechanism" for the web of belting 72. The belting 72 and winder mechanism are not expensive and yet the crop is well controlled during storage and during feeding from storage in that it is confined between layers of the belting.

The winder mechanism and web can also be used in balers with fixed position rolls defining the baling chamber.

As an alternative to a web consisting of a single belt having the width of the baling chamber as above described, a web comprised of several side-by-side belts can be used. The web can be in the form of rubber belting generally similar to that of the baling belts 46 but it can also, for example, be woven or of other suitable sheeting.

I claim:

1. In a large round baler including a baling chamber, a storage chamber and a crop delivery unit for delivering crop selectively to the baling or storage chamber, the improvement comprising: said storage chamber containing a winder mechanism including a belt support shaft extending transversely across said storage chamber, belt material wrapped upon said support shaft, and a drivable coiling mechanism including a coiling shaft extending transversely across said storage chamber in spaced relationship to said support shaft; said belt material including an end fixed to said coiling shaft and including a portion extending between said support and coiling shafts and located for receiving crop thereon from the delivery unit; and said winder mechanism being drivable for coiling the belt material into a spiral so that the crop is sandwiched in the spiral for storage and for uncoiling the belt material so that the crop is released for delivery to the baling chamber.

2. The large round baler defined in claim 1 wherein an anchor plate extends outwardly from and has an inner edge portion rigidly attached to the coiling shaft and an outer edge portion attached to said end of the belt material.

3. The large round baler defined in claim 2 wherein said plate extends radially to the coiling shaft.

4. The large round baler defined in claims 2 or 3 wherein said coiling mechanism includes at least one spacer plate extending outwardly from and fixed to the coiling shaft.

5. The large round baler as defined in claim 1 wherein said winder mechanism includes an idler roll which is disposed intermediate the belt support and coiling shafts and over which the belt material is trained.

6. The large round baler defined in claim 1 wherein said delivery unit includes a pickup and a feeder fork mechanism at the downstream end thereof.

7. The large round baler defined in claim 5 wherein the baling chamber has its inlet for the crop on the underside of the machine, the belt material support shaft is at the front of the machine, the idler roll is above the pickup and the coiling shaft is at a level above the idler roll and the belt material support shaft.

8. The large round baler according to claim 1 in which the belt material comprises a single conveyor belt.

* * * * *